Aug. 28, 1962     L. BERGSTEIN     3,051,052
VARIFOCAL LENS SYSTEM WITH FOUR POINTS OF
EXACT IMAGE SHIFT COMPENSATION
Filed Aug. 31, 1959     4 Sheets-Sheet 1
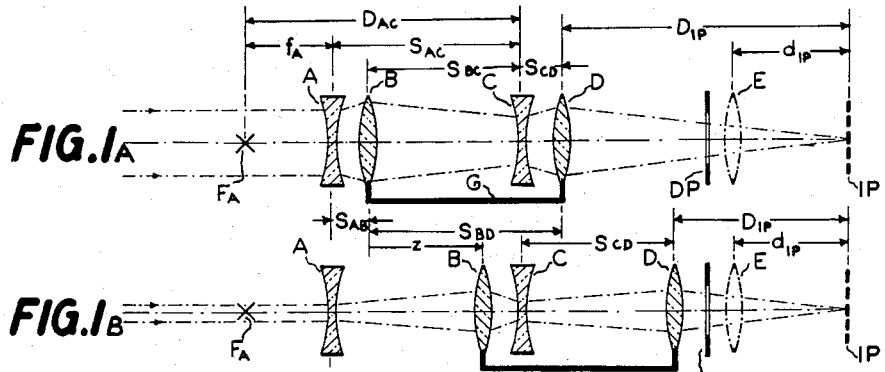
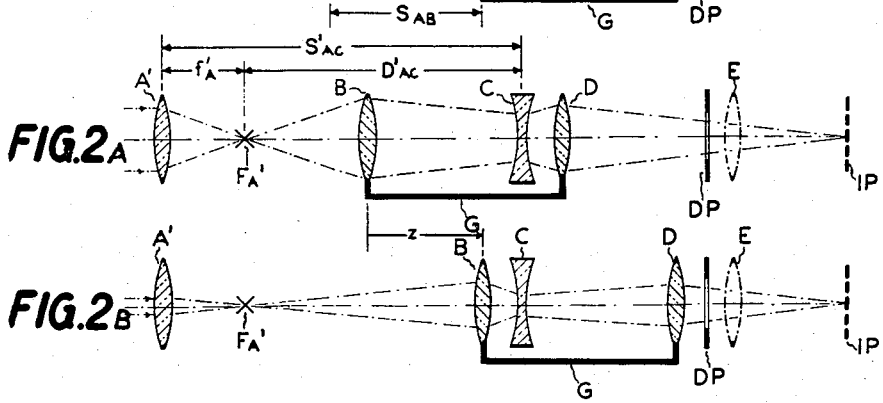
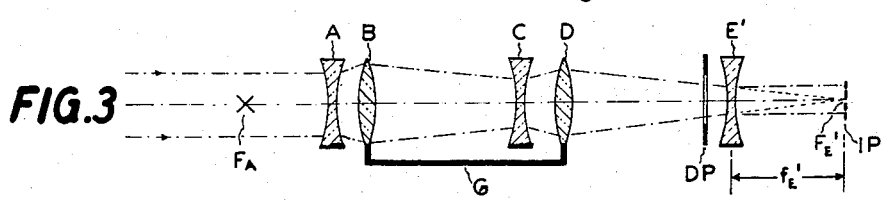
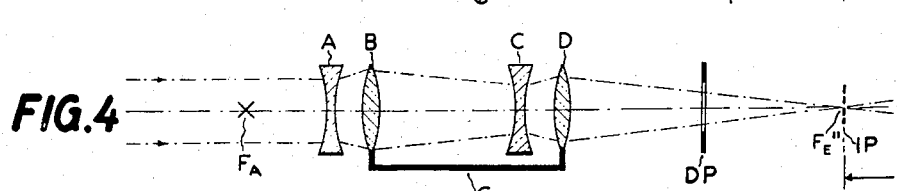
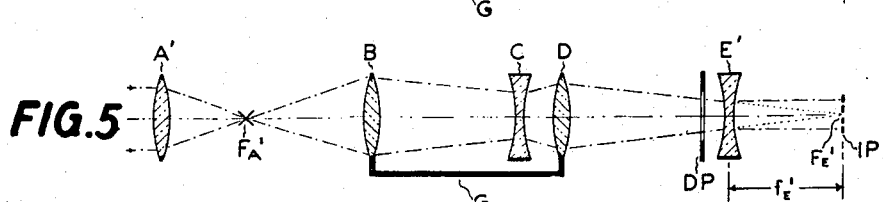
INVENTOR:
L. BERGSTEIN
BY
AGENT

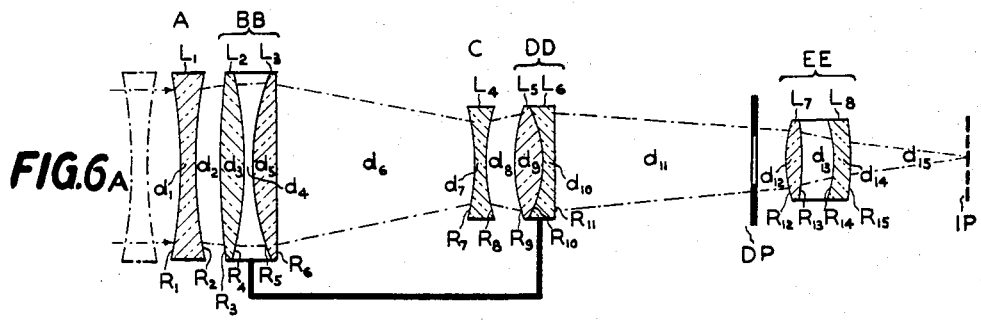
FIG.6A
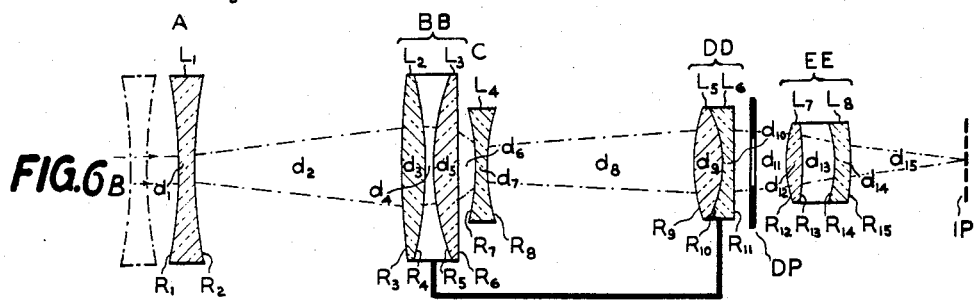
FIG.6B
FIG.7
| ELEMENT | LENS | GLASS | | RADII | THICKNESSES and SEPARATIONS |
|---|---|---|---|---|---|
| | | $N_d$ | V | | |
| A | $L_1$ | 1.617 | 50.0 | $R_1 = -345.00$<br>$R_2 = +345.00$ | $d_1 = 5.90$<br>$d_2 =$ from 2.47 to 102.47 |
| BB | $L_2$ | 1.620 | 60.0 | $R_3 = +675.40$<br>$R_4 = -258.75$ | $d_3 = 12.00$<br>$d_4 = 1.12$ |
| | $L_3$ | 1.620 | 60.0 | $R_5 = +141.65$<br>$R_6 = \infty$ | $d_5 = 12.00$<br>$d_6 =$ from 107.35 to 7.35 |
| C | $L_4$ | 1.720 | 50.0 | $R_7 = -127.55$<br>$R_8 = +88.05$ | $d_7 = 4.50$<br>$d_8 =$ from 11.35 to 111.35 |
| DD | $L_5$ | 1.620 | 60.0 | $R_9 = +77.20$<br>$R_{10} = -50.50$ | $d_9 = 13.50$<br>$d_{10} = 4.50$ |
| | $L_6$ | 1.620 | 36.2 | $R_{11} = \infty$ | |
| DIAPHRAGM | | | | | $d_{11} =$ from 122.85 to 22.85 |
| EE | $L_7$ | 1.517 | 64.5 | $R_{12} = +59.50$<br>$R_{13} = -403.50$ | $d_{12} = 6.14$<br>$d_{13} = 20.27$ |
| | $L_8$ | 1.720 | 50.0 | $R_{14} = -59.50$<br>$R_{15} = -403.50$ | $d_{14} = 5.00$<br>$d_{15} = 87.64$ |

3,051,052
VARIFOCAL LENS SYSTEM WITH FOUR POINTS OF EXACT IMAGE SHIFT COMPENSATION
Leonard Bergstein, 1583 Lincoln Place, Brooklyn, N.Y.
Filed Aug. 31, 1959, Ser. No. 837,032
5 Claims. (Cl. 88—57)

My present invention relates to a varifocal lens system of four components as described in my co-pending application Ser. No. 558,665, filed January 12, 1956, now abandoned, of which the present application is a continuation-in-part.

In my co-pending application Ser. No. 554,287, filed December 20, 1955, now Patent No. 2,906,177 issued September 29, 1959, I have disclosed a general theory of varifocal systems enabling the designing of such systems with any number of components. In accordance with this theory, a system of $n$ alternately stationary and movable components (including a movable rear component) can be arranged to have an overall focal length variable between two predetermined values upon a variation of the spacing between the stationary and the movable components and to produce an image in a plane whose shift $y$ from a reference position will be zero in $n$ predetermined positions of the movable components relative to the stationary components. The displacement of the movable set of components has been designated $z$, ranging between two extreme values $z_{min}$ and $z_{max}$. The first value of $z$ for which $y$ equals zero is designated $z_1$ and may or may not be equal to $z_{min}$; the last value of $z$ for which $y$ is zero has been designated $z_n$ and may or may not be equal to $z_{max}$. The larger the value of $n$, the closer is the spacing of the zeros of the curve $y(z)$ and the flatter this curve becomes between the points $z_1$ and $z_n$, whereby the peaks of the image deviation $y$ approach zero as the number of components is increased. Naturally, this number must be held within limits dictated by physical as well as economic considerations.

Four-component varifocal lens systems have hitherto been designed and the characteristic values of their components calculated on the assumption that the lenses were infinitely thin. Systems designed on the basis of this assumption have the disadvantage that the three peaks of the image-plane shift between the zeroes differ considerably from one another. Another disadvantage is that, when finite lens thickness is taken into account, the displacement $z$ of the movable components is found to be considerably less than the theoretical value of $z$, thereby cutting off a portion of the curve $y(z)$ and one or another of the zeroes, so as again to result in a large increase of the image-plane shift. To avoid this disadvantage, such systems are designed to be larger (and, therefore, more expensive) than the theoretical requirements warrant.

The general object of my present invention is to provide a compact four-component varifocal system having the smallest possible image deviation.

Another object of this invention is to provide a four-component varifocal system which is corrected for spherical and chromatic aberrations, coma, astigmatism and field curvature throughout its operative range.

I have found, in accordance with this invention, that a four-component varifocal system adapted to satisfy the foregoing objects is one in which the second, third and fourth components (counting the stationary component nearest the object as the first) are alternately refracting (i.e., respectively, either positively, negatively and positively, or negatively, positively and negatively) and wherein these three components are so dimensioned that no real image will exist therebetween. As disclosed in my above-identified patent (wherein, however, the lens components are counted in ascending order from the image plane), the position of the image plane of the varifocal system will remain unaffected if both the power of the first element and its spacing from the next component are so varied that the position of the secondary focal point of the first component remains unchanged; it follows that the relative spacing of the first and second components is not a critical parameter and that the varifocal system will be fully determined if, in addition to the focal lengths (or powers) and the relative spacings of the second, third and fourth components, the distance between the second component and the secondary focal point of the first component is given. Thus the front (or first) component may be either positively or negatively refracting so far as image-deviation suppression is concerned.

I have found further that a lens system as described above and designed on the assumption of finite lens thickness and minimum image-plane displacement should have two movable components whose focal lengths have a ratio ranging, for optimum results, between substantially 1.03 and 1.20. The more forwardly positioned movable component will have the greater focal length if the movable components are positively refracting; otherwise, its focal length will be less than that of the movable rear component of the varifocal system.

One (not necessarily controlling) advantage of using a front component of the same refractivity type as the third component is that the resulting equality between the number of positively and negatively refracting components makes it possible to reduce Petzval's sum $\Sigma \varphi / N_d$ to zero ($\varphi$ being the refractive power and $N_d$ being the index of refraction of each component) so as to correct for field curvature and astigmatism throughout the operative range of the system.

The lens combination having collective movable components along with a negative front component will give a real, inverted image and will thus be usable as a photographic, motion-picture or television objective, whereas the presence of a positively refracting front component in such system will produce a real, upright image. With dispersive movable components the image will be virtual.

If a supplemental lens member or group is fixedly positioned behind the fourth (or last movable) component of either type of varifocal system according to this invention in such manner that the primary focal plane of the supplemental system coincides with the substantially stationary image plane of the varifocal group, the entire lens assembly becomes an afocal system with variable magnification. If the two planes do not coincide, the resulting combination will have the same optical properties as the varifocal four-component front group, yet with a modified focal length and back-focal distance. Such a focal combination may be provided with an appropriate diaphragm in order to act as a photographic objective. The supplemental system may also be used to derive a real image from a virtual image produced by the varifocal front group.

Definite relationships have been found to exist between the location of the points of full compensation $z_1$, $z_2$, $z_3$, $z_4$ and the focal lengths $f_B$, $f_C$, $f_D$ of the second, third and fourth lens components, respectively, as well as between the spacings of the various lens components. It will be convenient to describe these relationships with reference to a varifocal coefficient $K$ defined as $$\pm \frac{f_{max} - f_{min}}{f_{max} + f_{min}} \text{ or } \frac{R_f - 1}{R_f + 1}$$

where the varifocal range $R_f$ is equal to $f_{max}/f_{min}$; $f_{max}$ is the maximum overall focal length and $f_{min}$ is the minimum overall focal length of the system.

In such a system, having a stationary front component, a movable second component behind the first component, a stationary third component behind the second component and a movable fourth component on the image side of the varifocal lens group, I have found that the image deviation $y$ may be represented as a fourth-order polynomial of $z$ according to the relationship $$y = \frac{z^4 + a_1 z^3 + a_2 z^2 + a_3 z}{z^3 + b_1 z^2 + b_2 z + b_3} \quad (1)$$

where the system has an image distance $x$, measured between the image plane and the secondary focal point of the fourth component, equal to $x_0 + z$ for four predetermined values $z_1, z_2, z_3, z_4$ of a variable $z$ representing the axial displacement of the movable components relative to a reference position, $x_0$ being a constant equal to $$\frac{f_4^2 a_2}{b_3}$$

and where $z_1$ is assumed to be zero. The coefficients $a_1, a_2, a_3$ and $b_1, b_2, b_3$ are functions of the parameters of the system; thus, $$a_1 = b_1 - x_0 \quad (2a)$$
$$a_2 = b_2 - x_0 b_1 + f_4^2 \quad (2b)$$
$$a_3 = b_3 - x_0 b_2 + f_4^2 c_1 \quad (2c)$$

The values of $b_1, b_2, b_3$, and $c_1$ are given in terms of the principal focal lengths $f_4, f_3, f_2$ of the fourth, third and second components, respectively, and of the interfocal spacings $d_{3,4}$ to $d_{1,2}$ of all the components, measured from the secondary focal point of any lower-order component to the primary focal point of the nearest higher-order component, by the expressions $$b_1 = d_{3,4} - d_{2,3} + d_{1,2} \quad (3a)$$
$$b_2 = -d_{3,4} d_{2,3} + d_{3,4} d_{1,2} - d_{2,3} d_{1,2} + f_3^2 + f_2^2 \quad (3b)$$
$$b_3 = -d_{3,4} d_{2,3} d_{1,2} + d_{1,2} f_3^2 + d_{3,4} f_2^2 \quad (3c)$$
$$c_1 = -d_{2,3} + d_{1,2} \quad (4)$$

Of the six unknown parameters $f_2, f_3, f_4, d_{1,2}, d_{2,3}$ and $d_{3,4}$ of the generalized four-component system described above, the separations $S_{2,3}$ and $S_{3,4}$ between the proximal notal points of the second, third and fourth components may be chosen by the designer, permitting $d_{2,3}$ and $d_{3,4}$ to be eliminated, since $$S_{2,3} = f_2 + d_{2,3} + f_3 \quad (5a)$$

and $$S_{3,4} = f_3 + d_{3,4} + f_4 \quad (5b)$$

Only four parameters of the system remain to be determined, namely the three focal lengths $f_2, f_3, f_4$ and the interfocal spacing $d_{1,2}$ between the first and second components. These are given by the following four equations:

$$a_1 = -z_2 - z_3 - z_4 \quad (6a)$$
$$a_2 = z_2 z_3 + z_2 z_4 + z_3 z_4 \quad (6b)$$
$$a_3 = -z_2 z_3 z_4 \quad (6c)$$
$$R_t = (b_3 + b_2 + b_1)/b_3 \quad (7)$$

The foregoing theory of four-component varifocal systems will be further developed and explained with reference to the accompanying drawing in which:

FIGS. 1A and 1B diagrammatically show, in different positions of the movable components, an optical system according to the invention utilizing a negative fixed front lens;

FIGS. 2A and 2B are analogous views of a system according to the invention employing a positive front lens;

FIG. 3 shows an afocal system adapted for use as a camera front attachment, formed by combining the system of FIGS. 1A and 1B with a supplemental dispersive system;

FIG. 4 shows an afocal system similar to that of FIG. 3 but with a supplemental collective lens, adapted to be used as a varifocal telescope;

FIG. 5 shows another varifocal telescope according to the invention formed by combining the system of FIGS. 2A and 2B with a supplemental lens of the type shown in FIG. 3;

FIGS. 6A and 6B are views corresponding to FIGS. 1A and 1B but with the simple lenses thereof replaced by compound lenses or lens combinations;

FIG. 7 is a table relating to the system of FIGS. 6A and 6B;

Figure 8:
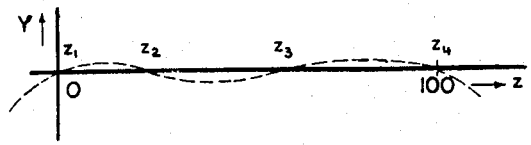
FIG. 8 is a graph showing the image-plane deviation in a system embodying my invention.

The system of FIGS. 1A and 1B, adapted to be used as an objective in a photographic camera, comprises a dispersive fixed front component A, a collective movable front component B, a dispersive fixed rear component C, and a collective movable rear component D. Movable components B, D are ganged for displacement in unison by means of a rigid link G. A diaphragm DP is assumed to have been positioned behind the assembly A—D, which may be considered as a varifocal attachment, followed by a further fixed, collective lens member E. The provision of such member E is, however, not essential, especially in the case of a system whose front component A is negatively refracting, as in the system under consideration, since in such case a real, inverted image will be produced beyond the rear component D. Although all of the members A through E have been shown diagrammatically as simple lens elements, the same are also representative of compound lenses and lens combinations, e.g. as shown more particularly in FIGS. 6A and 6B.

The only independently variable parameter in the system of FIGS. 1A and 1B, for the purpose of varying its focal length, is the spacing between either of the components A, C of the stationary set and either of the components B, D of the movable set, such as the distances $s_{AB}$ between members A and B and $s_{CD}$ between members C and D. The image distance $D_{ip}$ of attachment A—D, measured between rear component D and image plane IP, varies in substantially complementary fashion to the relative spacing $d_{AB}$, thereby maintaining virtually invariable the back-focal length $d_{ip}$ of the overall system as measured between back member E and image plane IP.

The virtual secondary focus $F_A$ of negative front component A has been shown spaced from that component by the latter's focal length $f_A$. This focal length, being directed toward the object side of the system, is added to the spacing $s_{AC}$ between the components A, C of the stationary set to give the parameter $D_{AC}$, or the spacing between the focal point $F_A$ and the fixed rear component C, which co-determines the position of image plane IP. The fixed spacing between components B and D is indicated at $s_{BD}$.

In FIGS. 2A and 2B there is shown a system similar to that of FIGS. 1A and 1B, except for the fixed front component A' which represents a collective lens element substituted for the dispersive element A of the preceding embodiment. The secondary focal point of element A' has been shown at $F_A'$ and is spaced from component C by a distance $D_{AC}'$ equal to the similarly designated distance in FIG. 1A; since the focal length $f_A'$ of the front component is now directed toward the rear of the system, it is subtracted from the inter-component spacing $s_{AC}'$ to give the parameter $D_{AC}'$. Inasmuch as elements B, C, D, E are assumed to be identical with the thus designated components in FIGS. 1A and 1B and the relative spacing thereof is the same, the position of the image plane IP is likewise unchanged.

In FIG. 3 the assembly A, B, C, D of FIG. 1A precedes a dispersive rear lens component E' of focal length $f_E'$ whose focal point $F_E'$ coincides with the image plane IP of the varifocal group. This results in an afocal system adapted to be used, for example, as a camera front attachment affording a wide range of variations in image size.

FIG. 4 shows a similar afocal system wherein, however, the dispersive member E' has been replaced by a collective member E″ of focal length $f_E″$ positioned behind the image plane IP which coincides with its primary focal point $F_E″$. FIG. 5 illustrates another afocal system in which the varifocal lens group A′, B, C, D of FIG. 2A has been combined with the dispersive lens member E′ of FIG. 3.

It should be noted that in the two last-mentioned systems, in which there are even numbers of negative components, the image will be upright so that the system may be used directly as a telescope with variable magnification. These latter systems may also be used in conjunction with photographic cameras or the like if the righted image is non-objectionable.

As a numerical example, the parameters of the lens systems of FIGS. 1–5 will be given for an assembly with a desired ratio $R_t$ of maximum to minimum overall focal length equal to 6:1 (determined by the lens designer) which is to produce a real image behind the system. The example will be more clearly understood with reference to the graphs of FIGS. 8, 9 and 10.

FIG. 8 shows a graph of the image-plane deviation $y$ as a function of the displacement $z$ of the movable components, thus illustrating the significance of the zero points $z_1$, $z_2$, $z_3$, and $z_4$ (points of full compensation). It will be noted that the peaks of curve $y(z)$ between these zeros, and particularly the first and the third one, are of substantially equal magnitudes.

Figure 9:
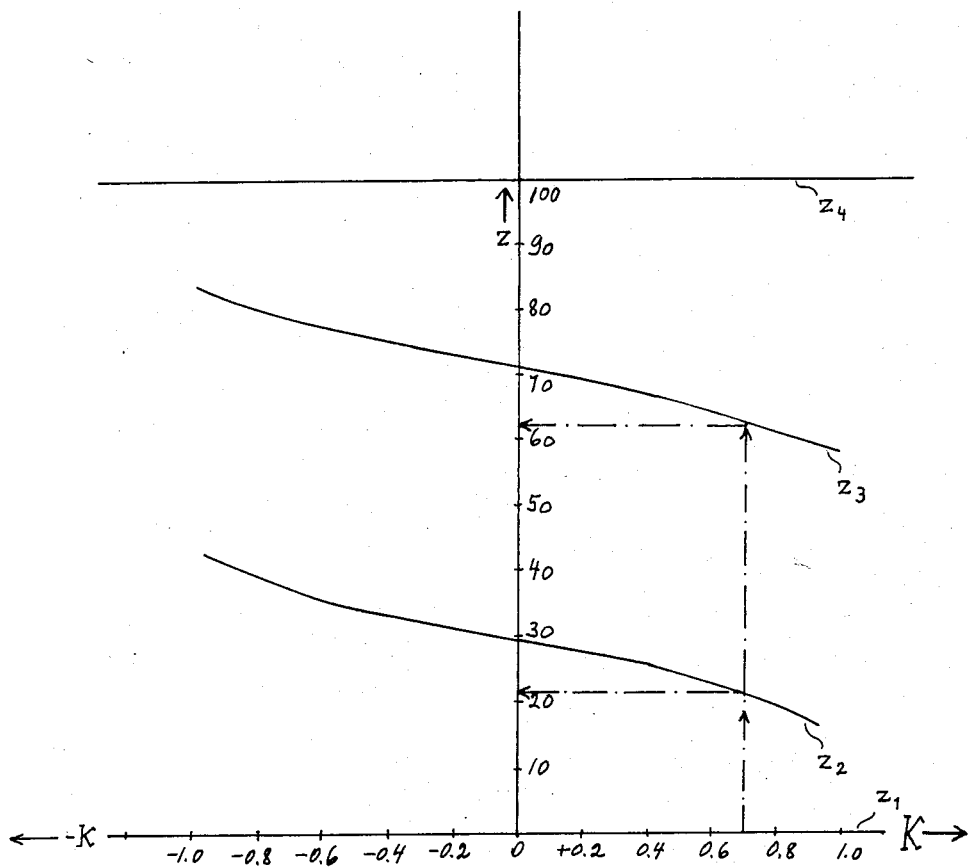
FIGS. 9 and 10 are graphs showing further characteristics of a lens system according to my invention.

FIG. 9 is a graph showing the variation of $z_2$ and $z_3$ with the varifocal coefficient K (assuming $z_1$ to be zero and $z_4=100$) in a system according to the invention, designed for minimum image deviation. It will be seen that the slopes of the substantially parallel curves for $z_2$ and $z_3$ are negative and generally symmetrical about the z-axis and that the values of $z_2$ on one side of this axis complement those of $z_3$ on the other side thereof, for equal absolute values of K. The maximum displacement $z$ of the movable components is given a total of 100 units.

Figure 10:
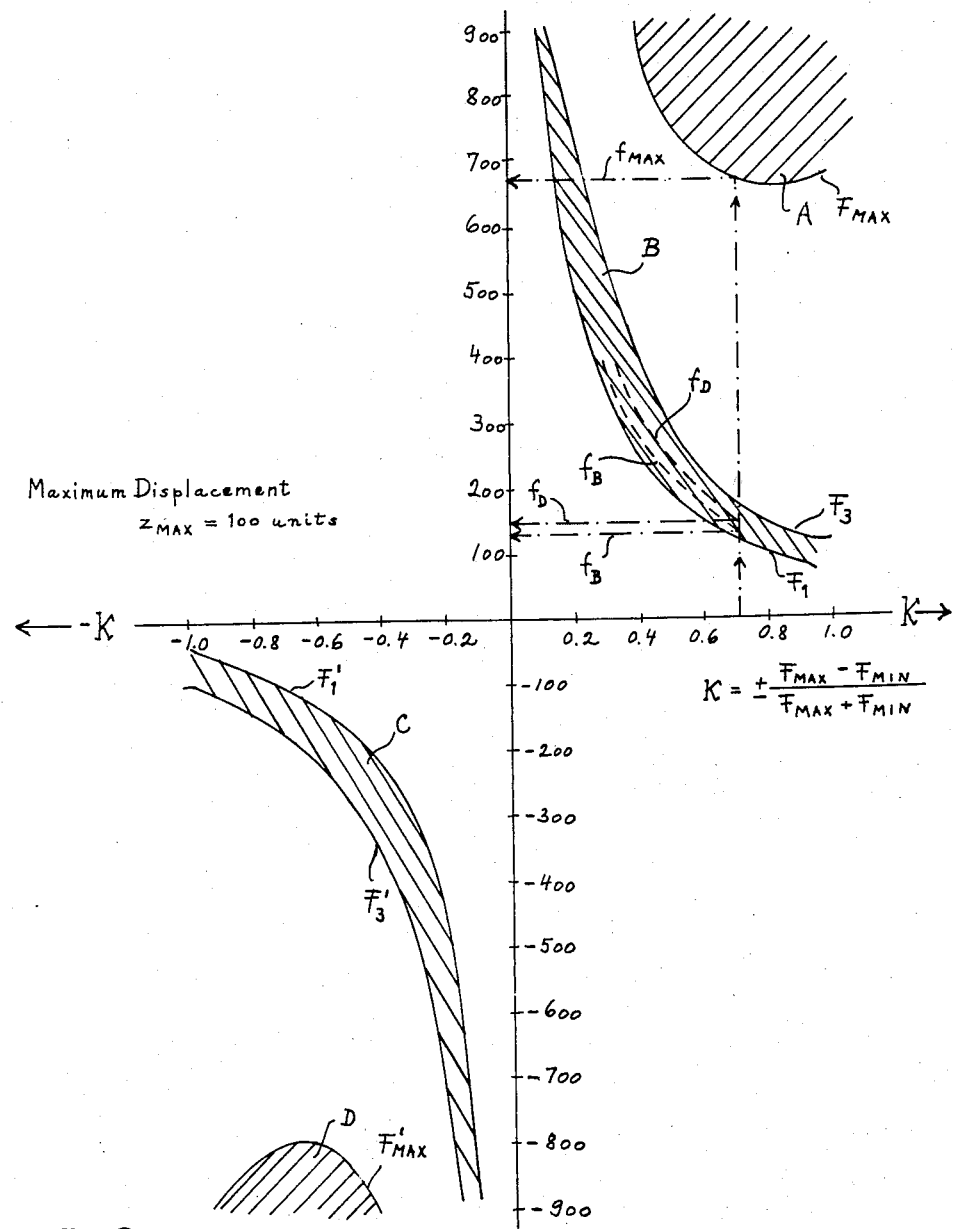

FIG. 10 shows shaded areas A and D, bounded by curves $F_{max}$ and $F'_{max}$ which in the regions illustrated are generally parabolic, whence the maximum focal length $f_{max}$ of the system may be selected with different positive and negative values, respectively, of K. Areas B and C, bounded by curves $F_1$, $F_3$ and $F_1′$, $F_3′$, respectively, which are generally hyperbolic and asymptotic to the line $K=0$ indicate corresponding ranges of variations for the focal lengths $f_B$, $f_D$ of the movable components, the two dotted-line curves so labeled within area B representing values for which these focal lengths have the preferred ratio of 1:1.05.

The ratio $R_t=6:1$ yields a varifocal coefficient $K=0.71$ (from $$K=\frac{R_t-1}{R_t+1}$$

since the systems of FIGS. 1–5 have positively refracting movable components). From FIG. 9, a varifocal coefficient $K=0.71$ will be seen to define points of full compensation at $z_1=0$, $z_2=22$, $z_3=62$, and $z_4=100$. The designer must also choose values for the spacings $s_{BC}$, $s_{CD}$. Taking $s_{BC}=117.62$ and $s_{CD}=12.37$ (at $z_1=0$, and assuming the maximum displacement $z_{max}=$to 100 units) to account for the finite thicknesses of the component lenses, and substituting these values in Equations 2, 6 and 7

($R_t=6$, $z_1=0$, $z_2=22$, $z_3=62$, $z_4=100$, $s_{2,3}=s_{BC}=117.62$, $s_{3,4}=s_{CD}=12.37$), we obtain four equations $$b_1-x_0=-184 \tag{8a}$$
$$b_2-x_0b_2+f_4{}^2=9764 \tag{8b}$$
$$b_3-x_0b_2+f_4{}^2c_1=136400 \tag{8c}$$
$$(b_1+b_2+b_3)/b_3=6 \tag{9}$$

From the algebraic solution of the above relationships together with the Equations 3, 4, the focal length $f_B$ of component B will be found to be $+131.0$, the focal length $f_C$ of component C to have a value of $-71.7$, and the focal length $f_D$ of component D to have a value of $+124.4$. The parameter $D_{AC}$, previously defined as the algebraic difference of distance $s_{AC}$ and focal length $f_A$, has a numerical value of 407.5. The effective distance $s_{BD}$ between the components B and D is 130.0

The overall focal length of the system varies substantially between $2.34f_A$ and $0.39f_A$ as the spacing between the movable and stationary sets is varied from $s_{BC}=117.62$ and $s_{CD}=12.37$ ($z_1=0$) to $s_{BC}=17.62$ and $s_{CD}=112.37$ ($z_4=100$). The maximum image deviation occurring between points of full compensation at which curve $y(z)$ of FIG. 8 intersects the z axis has an absolute value of 0.35.

Since focal length $f_A$, as previously pointed out, may be selected quite arbitrarily, this focal length has only the restriction that, at a varifocal-coefficient value of $K=0.71$, it must be less than $-289.88$ in order to permit a variation of z from 0 to 100. It is advantageous, however, in case any of the above systems are to be used as photographic objectives or as attachments to photographic objectives, to use a negative front component with $f_A$ equal substantially to $-279.00$. With this value of $f_A$, not only is the spacing $s_{AB}$ variable from 10.88 ($z_1=0$) to 110.88 ($z_4=100$) and thus the minimum required, but it will also be found that Petzval's sum (previously defined) is substantially zero, thereby making it possible to correct for the aforementioned aberrations. In that case, the overall focal length will be variable between substantially 652.8 and 108.8.

Since the movable components (lenses B and D) of the aforedescribed example are positively refracting, the more forwardly positioned movable component will be seen to have the greater focal length. The lens system, therefore, has two movable components whose focal lengths have a ratio of 1.05 ($f_C/f_D$) for optimum results. From the graph of FIG. 10, the maximum focal length of a four-component system ($f_{max}$) and the focal lengths of the movable components ($f_C$, $f_D$) may be determined upon the selection of a varifocal coefficient as shown, for a system whose movable components have a focal-length ratio of 1.05. From the preceding equations, similar curves may be obtained for the focal lengths of the other lens components and for movable components whose focal-length ratio falls within the optimum range (1.03–1.20) in order to simplify the lens-designing task.

A particularly useful embodiment of the above system is shown in FIGS. 6A and 6B.

The component A has been shown as a single dispersive lens $L_1$, having radii $R_1$, $R_2$ and thickness $d_1$. Spaced from this lens by a variable distance $d_2$ is component BB here shown to comprise a pair of air-spaced collective lenses $L_2$ (radii $R_3$, $R_4$ and thickness $d_3$) and $L_3$ (radii $R_5$, $R_6$ and thickness $d_5$) whose spacing is indicated at $d_4$. A variable air space $d_6$ separates lens $L_3$ from component C, shown as a single dispersive lens $L_4$ having radii $R_7$, $R_8$ and thickness $d_7$. Spaced from this member by a variable distance $d_8$ is component DD, consisting of a collective lens $L_5$ (radii $R_9$, $R_{10}$ and thickness $d_9$) cemented onto a dispersive lens $L_6$ (radii $R_{10}$, $R_{11}$ and thickness $d_{10}$). The variable diaphragm space $d_{11}$ separates component DD from back member EE, here shown as a positive lens $L_7$ (radii $R_{12}$, $R_{13}$ and thickness $d_{12}$) airspaced by a distance $d_{13}$ from a negative lens $L_8$ (radii $R_{14}$, $R_{15}$ and thickness $d_{14}$). The spacing $d_{15}$ between lens $L_8$ and the image plane IP corresponds, substantially, to image distance $d_{ip}$ of the preceding figures.

FIGS. 6A and 6B also illustrate an adjustment of front lens $L_1$ relative to the other components of the system from solid-line position to dotted-line position for the purpose of focusing the objective lens system $L_1$–$L_8$ upon an object located at a finite distance in front thereof; the image plane may be assumed to represent the position of a photosensitive film, a ground-glass plate, a photocathode or some other receiving surface upon which a sharp image of the desired object can thus be projected. The resulting image plane for finite focusing will be subject to the same compensation as the infinite-distance image plane obtained in the solid-line position of the lens since the position of the image produced by the front lens will remain unchanged.

The following specific numerical values for the parameters of the system of FIGS. 6A and 6B, including the radii, thicknesses, spacings, refractive indices $N_d$ and Abbé numbers $\nu$ of the various lens elements, have been found to give particularly good aberration correction through the operative range and have been reproduced in FIG. 7. The values for the radii, thicknesses and air spaces are based upon a numerical value of 100 units for the displacement $z_{max}$ of the movable components between the first and fourth points of exact image shift compensation.

| Element | Lens | Glass | | Radii | Thicknesses and Separations |
|---|---|---|---|---|---|
| | | $N_d$ | $\nu$ | | |
| A | $L_1$ | 1.617 | 50.0 | $R_1 = -345.00$ | $d_1 = 5.90$. |
| | | | | $R_2 = +345.00$ | |
| | | | | | $d_2 =$ from 2.47 to 102.47. |
| | | | | $R_3 = +675.40$ | $d_3 = 12.00$ |
| | $L_2$ | 1.620 | 60.0 | | |
| | | | | $R_4 = -258.75$ | |
| BB | | | | | $d_4 = 1.12$. |
| | | | | $R_5 = +141.65$ | |
| | $L_3$ | 1.620 | 60.0 | | $d_5 = 12.00$. |
| | | | | $R_6 = \infty$ | |
| | | | | | $d_6 =$ from 107.35 to 7.35. |
| | | | | $R_7 = -127.55$ | |
| C | $L_4$ | 1.720 | 50.0 | | $d_7 = 4.50$. |
| | | | | $R_8 = +88.05$ | |
| | | | | | $d_8 =$ from 11.35 to 111.35. |
| | | | | $R_9 = +77.20$ | |
| | $L_5$ | 1.620 | 60.0 | | $d_9 = 13.50$. |
| DD | | | | $R_{10} = -50.50$ | |
| | $L_6$ | 1.620 | 36.2 | | $d_{10} = 4.50$. |
| | | | | $R_{11} = \infty$ | |
| Diaphragm | | | | | $d_{11} =$ from 122.85 to 22.85. |
| | | | | $R_{12} = +59.50$ | |
| | $L_7$ | 1.517 | 64.5 | | $d_{12} = 6.14$. |
| | | | | $R_{13} = -403.50$ | |
| EE | | | | | $d_{13} = 20.27$. |
| | | | | $R_{14} = -59.50$ | |
| | $L_8$ | 1.720 | 50.0 | | $d_{14} = 5.00$. |
| | | | | $R_{15} = -403.50$ | |
| | | | | | $d_{15} = 87.64$. |

The above system has a focal length $f$ variable between substantially 109 and 654 in the absence of back member EE or between about 62.5 and 375 with member EE included, thus a ratio $R_f = 6:1$ within its operative range. The focal length $f_A$ of front element A equals $-279.0$, so that substantially $0.39 f_A \leq f \leq 2.34 f_A$ in the absence of member EE and $0.224 f_A \leq f \leq 1.344 f_A$ with member EE present. The maximum image deviation $\pm y_{max}$, occurring between points of full compensation ($z_1$, $z_2$, $z_3$, and $z_4$), at which the curve $y(z)$ of FIG. 8 intersects the z-axis, has an absolute value of 0.35 without member EE and of 0.08 with member EE.

I claim:
1. A varifocal optical lens system comprising four air-spaced components including a movable first component at the image side of the system, a stationary second component ahead of said first component, a movable third component ahead of said second component, and a stationary fourth component ahead of said third component, the refractive powers of said components being of alternate sign; and means for axially displacing said first and third components at the same rate with respect to said second and fourth components; said system having an image distance $x$, measured between an image plane and the secondary focal point of said first component, equal to $x_0 + z$ for four predetermined values $z_1$, $z_2$, $z_3$, $z_4$, of a variable $z$ representing the extent of displacement of said movable components from a reference position toward the image side of the system, $x_0$ being a constant; said image distance being increased by $\pm y$ for other values of $y$ where $y$ is an image deviation varying as a fourth-order polynomial of $z$ according to the equation.

$$y = \frac{z^4 + a_1 z^3 + a_2 z^2 + a_3 z}{z^3 + b_1 z^2 + b_2 z + b_3},$$ having the roots $z_1$, $z_2$, $z_3$ and $z_4$ the coefficients $a_1$ to $a_3$ and $b_1$ to $b_3$ of said polynomial satisfying a set of three equations $$a_1 = b_1 - x_0$$
$$a_2 = b_2 - x_0 b_1 + f_4^2$$
$$a_3 = b_3 - x_0 b_2 + f_4^2 c_1$$

the values of $b_1$ to $b_3$ and $c_1$ being given in terms of the principal focal lengths $f_1$ to $f_3$ of said first through third components and of the interfocal spacings $d_{1,2}$ to $d_{3,4}$ of all of said components, measured from the secondary focal point of any higher-order component to the primary focal point of the nearest lower-order component, by the expressions $$b_1 = d_{3,4} - d_{2,3} + d_{1,2}$$
$$b_2 = -d_{3,4} d_{2,3} + d_{3,4} d_{1,2} - d_{2,3} d_{1,2} + f_3^2 + f_2^2$$
$$b_3 = -d_{3,4} d_{2,3} d_{1,2} + d_{1,2} f_3^2 + d_{3,4} f_2^2$$
$$c_1 = -d_{2,3} + d_{1,2}$$

and further satisfying the relationship $$R_f = (b_3 + b_2 + b_1)/b_3$$

where $R_f$ is the varifocal range; said focal lengths $f_1$ and $f_3$ being different from each other with the larger focal length equaling substantially 1.03 to 1.20 times the smaller focal length.

2. An optical lens system according to claim 1 wherein said coefficients $a_1$ to $a_3$ and $b_1$ to $b_3$ have such magnitudes that, with the first root $z_1$ and the fourth root $z_4$ having numerical values of 0 and 100, respectively, the roots $z_2$ and $z_3$ have values lying on two substantially parallel curves which, when plotted on a graph having as its ordinates the values of $z$ and as its abscissae a parameter $$K = \frac{f_{max} - f_{min}}{f_{max} + f_{min}}$$

where $f_{max}$ and $f_{min}$ are the values of the overall focal lengths of the system in two positions of adjustment in which $z=$ either of the two roots $z_1$ and $z_4$, are continuous between $K = \pm 1$ and have slopes of invariable sign which are substantially symmetrical about the ordinate axis, said curves passing respectively through points having ordinates of approximately 30 and 70 units for $K = 0$ and through points having ordinates of approximately 22 and 62 units for $K=0.7$.

3. A varifocal optical lens system comprising four air-spaced components including a movable first component at the image side of the system, a stationary second component ahead of said first component, a movable third component ahead of said second component, and a stationary fourth component ahead of said third component, the refractive powers of said components being of alternate sign; and means for axially displacing said first and third components at the same rate with respect to said second and fourth components; said system having a minimum overall focal length $f_{min}$, and a maximum overall focal length $f_{max}$, and a varifocal coefficient K equal to $$+\frac{f_{max}-f_{min}}{f_{max}+f_{min}}$$

said first component having a focal length $f_D$, said third component having a focal length $f_B$, said focal length $f_D$ equaling 1.03 to 1.20 times said focal length $f_B$; the maximum axial displacement of said first and third components being 100 units; said system having a maximum overall focal length of a magnitude substantially falling within an area whose lower limit is delineated by a generally parabolic curve in the first quadrant of a graph having as its abscissa values of K between the limits of $K=+1$ and $K=-1$ and as its ordinate units of distance in terms of focal length, said parabolic curve passing substantially through the point (0.71,654), said focal lengths $f_D$ and $f_B$ having values falling within the area of said graph delineated by a pair of generally hyperbolic curves in the first quadrant substantially asymptotic to the line $K=0$ and passing substantially through the points (0.6,120) and (0.6,215), respectively.

4. A varifocal optical lens system comprising four air-spaced components including a movable first component at the image side of the system, a stationary second component ahead of said first component, a movable third component ahead of said second component, and a stationary fourth component ahead of said third component, the refractive powers of said components being of alternate sign; and means for axially displacing said first and third components at the same rate with respect to said second and fourth components; said system having a minimum overall focal length $f_{min}$, a maximum overall focal length $f_{max}$, and a varifocal coefficient K equal to $$-\frac{f_{max}-f_{min}}{f_{max}+f_{min}}$$

said first component having a focal length $f_D$, said third compent having a focal length $f_B$, said focal length $f_D$ equaling 0.97 to 0.85 times said focal length $f_B$; the maximum axial displacement of said first and third components being 100 units; said system having a maximum overall focal length of a magnitude substantially falling within an area whose lower limit is delineated by a generally parabolic curve in the third quadrant of a graph having as its abscissa values of K between the limits of $K=+1$ and $K=-1$ and as its ordinate units of distance in terms of focal length, said parabolic curve passing substantially through the point (−0.70, −795), said focal lengths $f_D$ and $f_B$ having values falling within the area of said graph delineated by a pair of generally hyperbolic curves in the third quadrant substantially asymptotic to the line $K=0$ and passing substantially through the points (−0.6, −120) and (0.6, −215), respectively.

5. A varifocal optical system comprising four air-spaced components including a stationary first component comprising a single first lens $L_1$ at the object side of the system, a movable second component behind said first component comprising a second lens $L_2$ and a third lens $L_3$ air-spaced from each other, a stationary third component behind said second component comprising a single fourth lens $L_4$, and a movable fourth component behind said third component comprising a fifth lens $L_5$ and a sixth lens $L_6$ cemented together; and means for axially displacing said second and fourth components relative to said first and third components; said first lens $L_1$, said second lens $L_2$, said third lens $L_3$, said fourth lens $L_4$, said fifth lens $L_5$ and said sixth lens $L_6$ having radii, thicknesses, relative separations, refractive indices $N_d$ and Abbé numbers $\nu$ substantially as given in the following table:

| Element | Lens | Glass $N_d$ | $\nu$ | Radii | Thicknesses and Separations |
|---|---|---|---|---|---|
| A | $L_1$ | 1.617 | 60.0 | $R_1=-345.00$ | $d_1=5.90$ |
|  |  |  |  | $R_2=+345.00$ | $d_2=$ from 2.47 to 102.47 |
| BB | $L_2$ | 1.620 | 60.0 | $R_3=+675.40$ | $d_3=12.00$ |
|  |  |  |  | $R_4=-258.75$ | $d_4=1.12$ |
|  | $L_3$ | 1.620 | 60.0 | $R_5=+141.65$ | $d_5=12.00$ |
|  |  |  |  | $R_6=\infty$ | $d_6=$ from 107.35 to 7.35 |
| C | $L_4$ | 1.720 | 50.0 | $R_7=-127.55$ | $d_7=4.50$ |
|  |  |  |  | $R_8=+88.05$ | $d_8=$ from 11.35 to 111.35 |
| DD | $L_5$ | 1.620 | 60.0 | $R_9=+77.20$ | $d_9=13.50$ |
|  |  |  |  | $R_{10}=-50.50$ | $d_{10}=4.50$ |
|  | $L_6$ | 1.620 | 36.2 | $R_{11}=\infty$ | $d_{11}=$ from 122.85 to 22.85 |
| Diaphragm |  |  |  | $R_{12}=+59.50$ | $d_{12}=6.14$ |
| EE | $L_7$ | 1.517 | 64.5 | $R_{13}=-403.50$ | $d_{13}=20.27$ |
|  |  |  |  | $R_{14}=-59.50$ | $d_{14}=5.00$ |
|  | $L_8$ | 1.720 | 50.0 | $R_{15}=-403.50$ | $d_{15}=87.64$ |

References Cited in the file of this patent

UNITED STATES PATENTS 2,566,485    Cuvillier    Sept. 4, 1951
2,778,272    Reymond    Jan. 22, 1957